United States Patent [19]

Hara et al.

[11] Patent Number: 4,870,149

[45] Date of Patent: Sep. 26, 1989

[54] SILICONE COMPOSITION FOR RENDERING SURFACES NON-ADHERENT

[75] Inventors: Yasuaki Hara; Hisashi Aoki; Kazuma Momii, all of Annaka, Japan

[73] Assignee: Shin-Etsu Chemical Co., Ltd., Tokyo, Japan

[21] Appl. No.: 226,022

[22] Filed: Jul. 29, 1988

[30] Foreign Application Priority Data

Jul. 29, 1987 [JP] Japan .................................. 62-189490

[51] Int. Cl.$^4$ ............................................. C08G 77/06
[52] U.S. Cl. ........................................ 528/15; 528/31; 528/32; 525/478
[58] Field of Search .................... 528/32, 15, 31; 525/478

[56] References Cited

U.S. PATENT DOCUMENTS 3,900,617  8/1975  Grenoble ............................. 427/387
4,057,596  6/1974  Takamizawa ........................ 427/387
4,071,664  1/1978  Grenoble ............................. 427/302
4,689,384  8/1987  Kondow et al. ...................... 528/32
4,721,764  1/1988  Fujiki et al. ........................ 528/32

FOREIGN PATENT DOCUMENTS 1374792  11/1974  United Kingdom .

Primary Examiner—Melvyn I. Marquis
Attorney, Agent, or Firm—Millen, White & Zelano

[57] ABSTRACT

A solvent-free releasing silicone composition for rendering surfaces non-adherent which gives a cured film having desirable slip factor, toughness, and high-speed peel characteristics without sacrificing its inherenty merits such as curability, uniformity in peel resistance, and the residual adhesive strength employs a diorganovinylpolysiloxane having trivinylsilyloxy as one end group and either a vinyldimethylsilyl or trimethylsilyl group as the other end group.

15 Claims, No Drawings

SILICONE COMPOSITION FOR RENDERING SURFACES NON-ADHERENT

BACKGROUND OF THE INVENTION

The present invention relates to silicone compositions for rendering surfaces non-adherent, more particularly to a solvent-free releasing agent silicone composition.

Conventionally, the most common agents for rendering surfaces non-adherent are manufactured in the form of a compound diluted in some organic solvent, which is generally called a solvent-type releasing agent. However, the trouble with such releasing agents is that the use of an organic solvent, which needs to be evaporated after application, results in lowering of the energy efficiency as well as in environmental pollution, and they are always dangerous for workers. In order to solve this problem, so-called solvent-free releasing agents have been developed which use virtually no solvent (examples of these are found in Japanese Patent Publication No.52-47485 and Japanese Patent Publication No.52-39791). Another solution to the same problem is a silicone-containing releasing agent in the form of an aqueous emulsion (for example, the one described in Japanese Patent Publication No.57-53143).

An example of a known solvent-free releasing agent silicone composition is a curable agent which has two main ingredients, namely a diorganovinylpolysiloxane having both ends stopped with a vinyldimethylsilyl group [$CH_2=CH-Si(CH_3)_2-$], and an organohydrogenpolysiloxane having at least two hydrogen atoms directly bonded to silicon atoms, which ingredients undergo an addition reaction (as described in Japanese Patent Publication No.52-39791; Japanese Laid open Patent Application No.57-77395; Japanese Laid-open Patent Application No.50-141591).

However, it has been experienced and reported that the cured film obtained from the above-described solvent-free releasing agent silicone composition tends to be more brittle, lower in slip factor, and excessively lower in the minimum force required for peeling, especially under a high-speed peeling condition, than that obtained from conventional solvent-type releasing agent silicone compositions. Although various modifications have been made so as to improve the above-mentioned three properties of the cured film of the solvent-free releasing agent, no known solvent-free releasing agent is endowed with all of these three qualities. For example, a solvent-free releasing agent silicone composition described in Japanese Laid-open Patent Application No.61-159480 has an improved slip factor, but is still unsatisfactory with respect to the film toughness and the minimum force required for peeling in the case of high-speed peeling.

To improve these properties, it has been proposed to increase the degree of polymerization of the diorganovinylpolysiloxanes themselves which are contained in the solvent-free releasing agent or to admix the diorganovinylpolysiloxanes with organopolysiloxanes having a high degree of polymerization. The results so far of such proposals have been such that although improvements are noticeable in the three properties, the curability of the silicone composition is lowered, the uniformity in the minimum requisite peel force is sacrificed, and the residual adhesive strength of the adhesive is weakened.

SUMMARY OF THE INVENTION

It is an object of the invention to provide a solvent-free releasing agent silicone composition which produces a cured film having desirable slip factor, sufficient toughness, and good high-speed peel characteristics without sacrificing its inherent qualities such as curability, uniformity in minimum requisite peel force, and releasability allowing the adhesive agent to maintain high residual adhesive strength.

The foregoing and other objects, features and advantages of the present invention are attained by employing as the diorganovinylpolysiloxane component of a curable two-component solvent-free releasing agent silicone composition comprising a diorganovinylsiloxane and an organohydrogenpolysiloxane, at least 40 weight percent of a diorganovinylsiloxane having trivinylsilyloxy as one end group and either vinyldimethylsilyl or trimethylsilyl as the other end group.

The foregoing and other objects, features and advantages of the present invention will be apparent from the following detailed description thereof.

DETAILED DESCRIPTION

In a preferred embodiment, the aforesaid diorganovinylpolysiloxanes are represented by one of the general formulae (I) and (II):

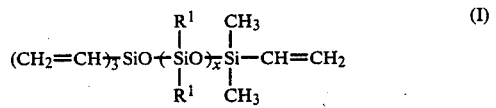

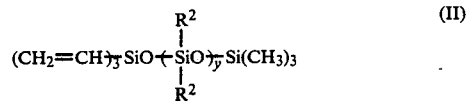

A preferred silicone composition of the present invention comprises:

(A) 100 parts by weight of a diorganovinylpolysiloxane component having at least two silicon-bonded vinyl groups at an end group and having a viscosity of 50 to 10,000 cSt at 25° C., said diorganovinylpolysiloxane component including 40 weight % of at least one diorganovinylpolysiloxane of formula (I) or (II) wherein $R^1$ and $R^2$ are monovalent organic radicals free from aliphatic unsaturation, and x and y are positive integers, preferably positive integers that impart a viscosity to the diroganovinylpolysiloxane of 50 to 10,000 cSt at 25° C.;

(B) 1 to 50 parts by weight per 100 parts by weight of component (A) of an organohydrogenpolysiloxane having at least two silicon-bonded hydrogen atoms per molecule; and (C) a catalytically effective amount of a platinum-containing catalyst.

The diorganovinylpolysiloxane employed as component (A) in the present invention preferably comprises 40–100 weight %, more preferably 60–100 weight %, thereof of one or both of the diorganovinylpolysiloxanes represented generally by formulae (I) and (II), respectively. If less than 40 weight % of component (A) is a diorganovinylpolysiloxane as defined hereinabove, the dependence of the minimum force required to peel an adhesive sheet from the cured film on the peeling speed becomes so small that the minimum force required for peeling the cured film at high speed is too small and the residual adhesive power of the adhesive weakens. The monovalent organic radicals represented by $R^1$ and $R^2$ in formulae (I) and (II), respectively, can be any non-reactive group, e.g., a lower alkyl group, such as methyl, ethyl, propyl, or butyl, or a lower alkoxyl group, such as methoxyl, ethoxyl, or propoxyl. Preferably $R^1$ and $R^2$ are low molecular weight groups, e.g., below about 100, and preferably more than 80 mol % of $R^1$ and $R^2$ are methyl groups.

The integers x and y ordinarily are in the range of 40 to 600, preferably 70 to 400.

In addition to those represented by the general formulae (I) and (II), component (A) optionally can comprise up to 60 weight percent of other kinds of diorganovinylpolysiloxanes which have two or more silicon-bonded vinyl groups at the ends of the molecule. Examples of such other kinds of diorganovinylpolysiloxanes are the conventional diorganovinylpolysiloxanes represented generally by the following formulae (III) and (IV):

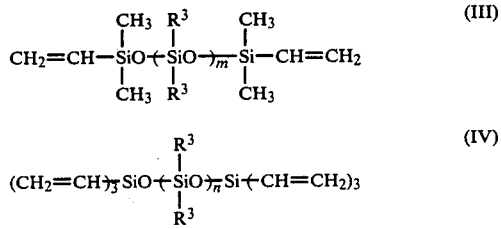

wherein $R^3$ represents a monovalent organic radical having no aliphatic unsaturation therein. For example, $R^3$ can be any one of the groups mentioned above as examples of $R^1$ and $R^2$. Preferably, more than 80 mol. % of the $R^3$ monovalent organic radicals are methyl groups. The subscripts m and n are positive integers, preferably, integers that impart a viscosity to the diorganovinylpolysiloxane of 50–10,000 cSt at 25° C., e.g., from about 50 to about 10,000 when $R^3$ is methyl.

The viscosity at 25° C. of component (A) is preferably 50 to 10,000 cSt, or mroe preferably 100 to 5,000 cSt. If the viscosity is lower than 50 cSt, the minimum force required for peeling the adhesive sheet or tape sticking to the cured film shows little dependence on the peel speed so that the minimum force required for peeling is excessively weak in the case of high speed peeling. If the viscosity is at least 50 cSt, the minimum force required for peeling the adhesive sheet sticking to the cured film shows some dependence on the peel speed, i.e., the minimum force for peeling increases as the peel speed increases, and as a result an appropriate peel resistance is obtained. However, if the viscosity of the diroganovinylpolysiloxanes exceeds 10,000 cSt, it becomes difficult to apply the composition at a high speed onto a film having a thickness of less than 2 μm.

The diorganovinylpolysiloxane of formula (I) and/or the diorganovinylpolysiloxane of formula (II), at least one of which is preferably present in component (A), can, for example, be prepared in the following manner:

The diorganovinylpolysiloxane of formula (I) can be prepared in the form of a mixture of the diorganovinylpolysiloxane having a vinyldimethylsilyl group at both ends and the diorganovinylpolysiloxane having a trivinylsilyl group at both ends, this preparation being achieved by means of a known method which consists of polymerizing together a cyclic diorganotetrasiloxane represented by the general formula (V), wherein $R^1$ has the same values as those in formula (I), a 1,3-divinyltetramethyldisiloxane represented by the formula (VI); and a hexavinyldisiloxane represented by the formula (VII), in the presence of an alkali such as potassium siliconate, and then neutralizing the resultant product with ethylene chlorohydrin.

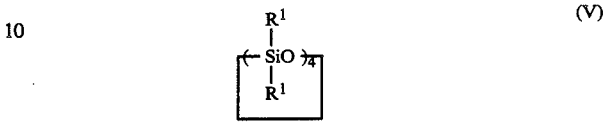

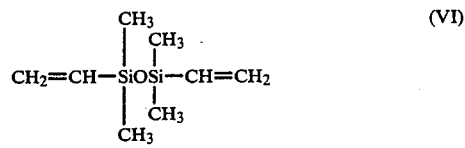

Two kinds of diorganovinylpolysiloxanes produced as by-products in which each molecule have the same end groups at its two ends are usually present in component (A). However, more than 40 weight % must be a diorganovinylpolysiloxane according to this invention and preferably is one of formula (I) or (II). The content of the diorganovinylpolysiloxane of formula (I) in the mixture of diorganovinylpolysiloxanes can be regulated so as to be greater than 40 weight % by controlling the charge of the two disiloxanes used as end-stopping agents.

The diorganovinylpolysiloxane represented by formula (II) is prepared, for example, by a known method which consists of copolymerizing trimethylsilanol [$(CH_3)_3SiO$] and a hexaorganotrisiloxane in acetonitrile as the solvent in the presence of a penta-coordinate catalyst, such as those represented by formulae (VIII) and (IX), whereby an organopolysiloxane with a silanol end group represented by formula (X) is thus-produced, which is then reacted with trivinylchlorosilane [$(CH_2=CH)_3SiCl$] in the presence of a hydrochloric acid-uptaking agent, e.g., triethylamine, pyridine, to produce a diorganovinylpolysiloxane represented by formula (II).

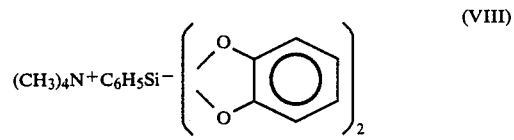

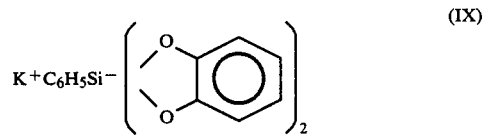

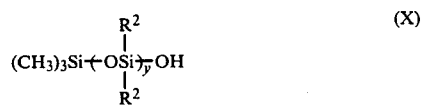

In accordance with this method, it is similarly possible to obtain the diorganovinylpolysiloxane represented by formula (I).

The organohydrogenpolysiloxane which is component (B) of the silicone composition of the invention has at least two, and preferably more than two, hydrogen atoms bonded to silicon atoms. The organic radicals bonded to silicon atoms may be any one of those mentioned as examples of the $R^1$ group of component (A). As an organohydrogenpolysiloxane of component (B), it is possible to use a known organohydrogenpolysiloxane that is commonly used in a curable silicone composition which cures when the organohydrogenpolysiloxane undergo an addition reaction with vinyl groups bonded to silicon atoms.

The viscosity of the organohydrogenpolysiloxane which is component (B) is preferably 10 to 500 cSt at 25° C. The amount of component (B) is 1 to 50 parts by weight, preferably 3 to 30 parts by weight, per 100 parts by weight of the diorganovinylpolysiloxane which is the component (A). An amount less than 1 part by weight may result in low curability of the resulting composition, which causes a transfer of uncured silicone composition to the surface of the adhesive, thereby weakening the residual adhesive strength of the adhesive sheet. On the other hand, more than 50 parts by weight may result in an extremely short useful bath life of the composition, and the slip factor of the cured film becomes so low that the inherent performance of the adhesive that is applied to the cured film becomes greatly impaired.

The platinum-containing catalyst, which is component (C) of the silicone composition of the invention, may be of the kind that are conventionally employed in the addition reactions of ≳Si-H groups to vinyl groups bonded to silicon atoms, namely chloroplatinates, platinum complex salts, platinum compounds such as complex consisting of a chloroplatinic acid and siloxane, and other compounds containing a platinum group metal. The amount of the platinum metal catalyst usually is 0.001 to 0.1 part by weight in terms of in terms of platinum content, per 100 parts by weight of component (A), which is enough to cause formation of a sufficiently cured film and is desirable from the economical point of view.

Besides components (A), (B), and (C), the composition according to the invention may contain other components, depending on various requirements and preferences, such other components including acetylene compounds (e.g., 3-methyl-1-butyne-3-ol and 3,5-dimethyl-1-hexyne-3-ol); nitrogen-containing retarding agents (such as acrylonitrile and 2-pentenenitrile); silica fillers (such as fumed silica and wet silica); dyestuff and pigment. Silica fillers improve the cured film in toughness and in adhesion to the surface of the substrate material, and enables control of the printability thereof as well as the slip factor.

The composition according to the invention is obtained by mixing the above-mentioned components. The viscosity of the composition is preferably 50 to 10,000 cSt from the viewpoint of the workability thereof at the time of the application of the composition.

In order to form an optimum film of the composition over the surface of the substrate to which it is applied, the composition is coated on the surface and heated at a temperature of 80° to 200° C. for 2 to 30 seconds whereby the composition cures to form a quality film.

The releasing silicone composition of this invention is described in more detailed manner by way of the following examples, in which the term "parts" always refers to "parts by weight" and the values of viscosity are all these obtained by the measurement at 25° C.

The measurements of physical properties used in the examples are described below.

CURABILITY OF THE COATING COMPOSITION

The composition was coated on the surface of polyethylene laminate paper (manufactured by Fuji Cream Co. Ltd.), and heated sequentially at 120° C. for 15 seconds, 20 seconds and 25 seconds, in a hot air circulation-type drying furnace. The appearance of the film was estimated by the following standards and the results are entered in table 1 using the respective marks:
O: not hazy
Δ: a little hazy
X: very hazy

PEELING RESISTANCE

The composition was coated on the surface of the same polyethylene laminate paper at the rate of 0.6 g/m², and heated at 120° C. for 30 minutes in a hot ir circulation-type drying furnace, whereby a cured film was formed on the paper. A kraft tape with a solvent-type pressure sensitive adhesive (manufactured by Nitto Denko Co. Ltd.) coated thereon was pasted on the surface of the cured film and a pressure of 20 g/cm² was then applied to the pasted kraft tape for 24 hours at 70° C. Thereafter, the pasted tape together with the cured film was cut in strips each having a width of 5 cm. The kraft tape was then peeled by using a tensile testing machine at a pulling angle of 180° and at a pulling velocity of 0.3 meter/minute, 12 meters/minute, and 60 meters/minute, respectively. The force (g) required to peel the cured film was measured with respect to each specimen.

SLIP FACTOR

As in the case of measuring the peeling force, a cured film was formed on the surface of the polyethylene laminated paper. A piece of SBR (butadien-styrene-rubber) measuring 40×40×2 (mm) was placed on the cured film surface, and weights weighing 200 g in all were placed as a load on the SBR; then the SBR was pulled in the direction parallel to the cured film surface and the frictional force (g/200 g) working between the cured film and the SBR piece was measured. Also, the smoothness of the surface of the film was estimated by touching it with a finger, and the results are shown in Table 1 in terms of the following standards:
O: very slippery
Δ: a little slippery
X: finger did not slip

EXAMPLE 1

(Product A)

(1) 732 parts of cyclic dimethylsiloxane, 8.2 parts of hexavinyldisiloxane, and 2.8 parts of 1,3-divinyltetramethyldisiloxane were polymerized together (by an equilibrium reaction), in the presence of potassium siliconate. Methylvinylpolysiloxanes having a viscosity of 680cSt were thus-obtained. The thus-obtained methylvinylpolysiloxanes had trivinylsilyl groups and vinyldimethylsilyl groups as end groups, in the molar ratio of 7:3 and 47 weight % of the methylvinylpolysiloxanes had trivinylsilyl as one end group and a vinyldimethylsilyl as the other.

(2) To 100 parts of the thus-produced methylvinylpolysiloxanes were added (i) 4.5 parts of a methylhydrogenpolysiloxane both of whose end groups were trimethylsilyl groups, and 90 mole % of whose siloxy units were of formula (XI), and whose viscosity was 100cSt; and (ii) 1.0 part of 3-methyl-1-butyne-3-ol. These components were uniformly mixed and then admixed with two parts (0.02 part in terms of platinum content) of a complex salt composed of platinum and vinylsiloxane. Product A was obtained whose properties are shown in Table 1.

COMPARATIVE EXAMPLE 1

(Product B)

For comparison with Example 1, the same process was repeated, differing only in that the 100 parts of the methylvinylpolysiloxane prepared in the process (1) of Example 1 was replaced by 30 parts of a dimethylpolysiloxane whose end groups both were dimethylvinylsilyl and whose viscosity was 600 cSt and 70 parts of a dimethylpolysiloxane whose end groups were both trivinylsilyl group and whose viscosity was 600 cSt. Product B was thus prepared.

EXAMPLE 2

(Product C)

(1) 732 parts of cyclic dimethylsiloxane, 5.9 parts of hexavinyldisiloxane and 4.7 parts of 1,3-divinyltetramethyldisiloxane were polymerized together (by an equilibrium reaction), in the presence of potassium siliconate. An organopolysiloxane having a viscosity of 560 cSt was thus obtained. The end groups of the thus-obtained organopolysiloxane were trivinylsilyl groups and vinyldimethylsilyl groups in the molar ratio of 5:5 and 50 weight % of the organopolysiloxane was a methylvinylpolysiloxane having trivinylsilyl as one end and vinyldimethylsilyl as the other.

(2) To 100 parts of the thus-obtained methylvinylpolysiloxane were added (i) 3.8 parts of the same methylhydrogenpolysiloxanes which was used in the process (2) of Example 1, and (ii) 1.0 part of 3-methyl-1-butyne-3-ol. These components were uniformly mixed and then admixed with two parts (0.02 part in terms of platinum content) of a complex salt composed of platinum and vinylsiloxane. Product C was thus-prepared.

COMPARATIVE EXAMPLE 2

(Product D)

For comparison with Example 2, the same process was repeated, differing only in that the 100 parts of the methylvinylpolysiloxane prepared in process (1) of Example 2 was replaced by 50 parts of a dimethylvinylpolysiloxane whose end groups both were dimethylvinyl and whose viscisity was 600 cSt and 50 parts of dimethylvinylpolysiloxane whose end groups both were trivinylsilyl group and whose viscosity was 600 cSt. Product D was thus-prepared.

EXAMPLE 3

(Product E)

(1) 0.6 part of trimethylsilanol, 100 parts of hexamethylcyclotrisiloxane, 0.025 part of a catalyst represented by the formula (XII), and 6.5 parts of acetonitrile for dissolving the catalyst were mixed uniformly and polymerized at 70°-80° C. for eight hours. The solvent was then removed to obtain polysiloxane in the form of a viscous liquid having a viscosity of 600 cSt. 100 parts of this polysiloxane, 1.1 part of trivinylmonochlorosilane, and 0.8 part of triethylamine were dissolved in 100 parts of toluene and dehydrochlorination was carried out at 60° C. for four hours. Thereafter, the solvent was removed by distillation to thereby obtain a polysiloxane in the form of a viscous liquid having a trivinylsilyl group as one end and trimethylsilyl as the other and having a viscosity of 600 cSt.

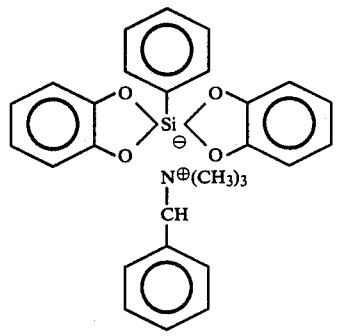

(2) To 100 parts of the methylvinylpolysiloxane obtained in process (1) were added (i) 2.9 parts of the same methylhydrogenpolysiloxane which was used in process (2) of Examples 1 and 2, and (ii) 1.0 part of 3-methyl-1-butyne-3-ol. These components were uniformly mixed and then were admixed with two parts (0.02 part in terms of platinum content), of a complex salt composed of platinum and vinylsiloxane. Product E was thus-prepared.

COMPARATIVE EXAMPLE 3

(Product F)

For comparison with Example 3, the same process was repeated, differing only in that the 100 parts of methylvinylpolysiloxane prepared in proces (1) of Example 3 were replaced by 100 parts of a dimethylvinylpolysiloxane whose end groups both were dimethylvinylsilyl and whose viscosity was 600 cSt. Product F was thus-obtained.

COMPARATIVE EXAMPLE 4

(Product G)

For comparison with Example 3, the same process was repeated, differing only in that the 100 parts of methylvinylpolysiloxane prepared in process (1) of Example 3 were replaced by 100 parts of a dimethylvinylpolysiloxane whose end groups both were trivinylsilyl and whose viscosity was 600 cSt. Product G was thus-obtained.

The properties of the Products A through G were measured as described before. The results are shown in Table 1.

As is apparent from the results of the Examples compared with those of the Comparative Examples, the properties of the cured films obtained from the compositions of the invention are significantly better than the compositions of the Comparative Examples, not only in curability and slip factor but also in that the peeling force depends in a desirable manner on the peeling velocity such that, when the cured film is subjected to a high speed peeling, there occurs no loose peeling, which is often caused by too small peel resistance. The compositions of the invention cure at relatively low temperatures and in a relatively short time, so that little shrinkage of the substrate material on which it is coated occurs. Furthermore, the useful bath life of the composition when kept at normal temperatures (0°–40° C.) is extended. Also, the cured film obtained from the composition of the invention has improved toughness, which renders the film highly durable. In addition, the problem of the weakening of the residual adhesive strength of the adhesive sheet or tape is markedly reduced.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

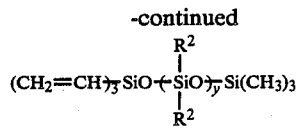

-continued where $R^1$ and $R^2$ are monovalent organic radicals free from aliphatic unsaturation, and x and y are positive integers from 40 to 600.

3. A solvent-free releasing agent silicone composition according to claim 2, comprising:
   (A) as the diorganovinylsiloxane component (A) a diorganovinylpolysiloxane of formula (I) or (II) having a viscosity of 50 to 10,000 cSt at 25° C.;
   (B) as the organohydrogenpolyxiloxane component (B) 1 to 50 parts by weight per 100 parts by weight of (A) of an organohydrogenpolysiloxane having at least two silicon-bonded hydrogen atoms per molecule; and
   (C) a catalytically effective amount of a platinum-containing catalyst.

4. A solvent-free releasing agent silicone composition according to claim 3, wherein x and y are positive integers that imprat a viscosity to component (A) of 50 to 10,000 cSt at 25° C.

5. A solvent-free releasing agent silicone composition according to claim 2, wherein 60 to 100 weight % of component (A) is a diorganovinylpolysiloxane represented either by formula (I) or (II).

6. A solvent-free releasing agent silicone composition according to claim 3, wherein at least 80 mol % of the

TABLE 1

| cases | products | curablity 15" | 20" | 25" | peeling resistance (force) (g/5 cm width) 0.3 | 12 | 60 m/min | slip factor kinetic friction force (g/200 g) | feel |
|---|---|---|---|---|---|---|---|---|---|
| Example 1 | A | Δ | O | O | 14 | 95 | 210 | 77 | O |
| Comparative Example 1 | B | X | Δ | O | 14 | 60 | 140 | 83 | Δ |
| Example 2 | C | Δ | O | O | 13 | 125 | 240 | 77 | O |
| Comparative Example 2 | D | X | Δ | O | 16 | 85 | 140 | 85 | Δ |
| Example 3 | E | X | Δ | O | 14 | 145 | 280 | 75 | O |
| Comparative Example | F | X | X | O | 14 | 105 | 160 | 78 | Δ |
| Comparative Example 4 | G | X | Δ | O | 19 | 110 | 120 | 80 | X |

What is claimed is:

1. A two-component solvent-free releasing agent silicone composition comprising a diorganovinylsiloxane component (A) and an organohydrogenpolysiloxane component (B) wherein at least 40 weight % of the diorganovinylsiloxane component (A) is one or more diorganovinylsiloxanes having trivinylsilyloxy as one end group and eithe rtrimethylsilyl or vinyldimethylsilyl as the other end group.

2. A solvent-free releasing agent silicone composition according to claim 1, wherein at least 40 weight % of the diorganovinylpolysiloxane component (A) is a diorganovinylpolysiloxane represented by either formula (I) or (II);

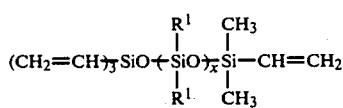

$R^1$ and $R^2$ groups are methyl groups.

7. A solvent-free releasing agent silicone composition according to claim 3, wherein the viscosity of the component (A) is 100 to 5,000 cSt at 25° C.

8. A solvent-free releasing agent silicone composition according to claim 3, wherein the organohydrogenpolysiloxane of component (B) has at least three hydrogen atoms bonded to silicon atoms per molecule.

9. A solvent-free releasing agent silicone composition according to claim 3, wherein at least 80 mol % of component (B) is an organohydrogenpolysiloxane having a methyl group in the molecule.

10. A solvent-free releasing agent silicone composition according to claim 3, wherein the viscosity of component (B) is 10 to 500 cSt at 25° C.

11. A solvent-free releasing agent silicone composition according to claim 3, wherein the amount of component (B) therein is 3 to 30 parts by weight per 100 parts of component (A).

12. A solvent-free releasing agent silicone composition according to claim 3, wherein the amount of the platinum-containing catalyst is 0.001 to 0.1 part by weight in terms of platinum content per 100 parts by weight of component (A).

13. A solvent-free releasing agent silicone composition according to claim 3, wherein the viscosity thereof is 50 to 10,000 cSt at 25° C.

14. A solvent-free releasing agent silicone composition according to claim 3,
wherein 60 to 100 weight % of the diorganovinyl-polysiloxane component is a diorganovinylpolysiloxane represented by either formula (I) or (II) in which at least 80 mol % of the $R^1$ and $R^2$ groups are methyl groups,
wherein the viscosity of component (A) is 100 to 5,000 cSt at 25° C.; and
wherein the organohydrogenpolysiloxane of component (B) has at least three hydrogen atoms bonded to silicon atoms per molecule.

15. A solvent-free releasing agent silicone composition according to claim 12 and wherein the amount of component (B) therein is 3 to 30 parts by weight per 100 parts of component (A).

* * * * *